April 24, 1934.  H. HARNISCHFEGER ET AL  1,955,959
GARAGE
Filed Jan. 16, 1928   2 Sheets-Sheet 1
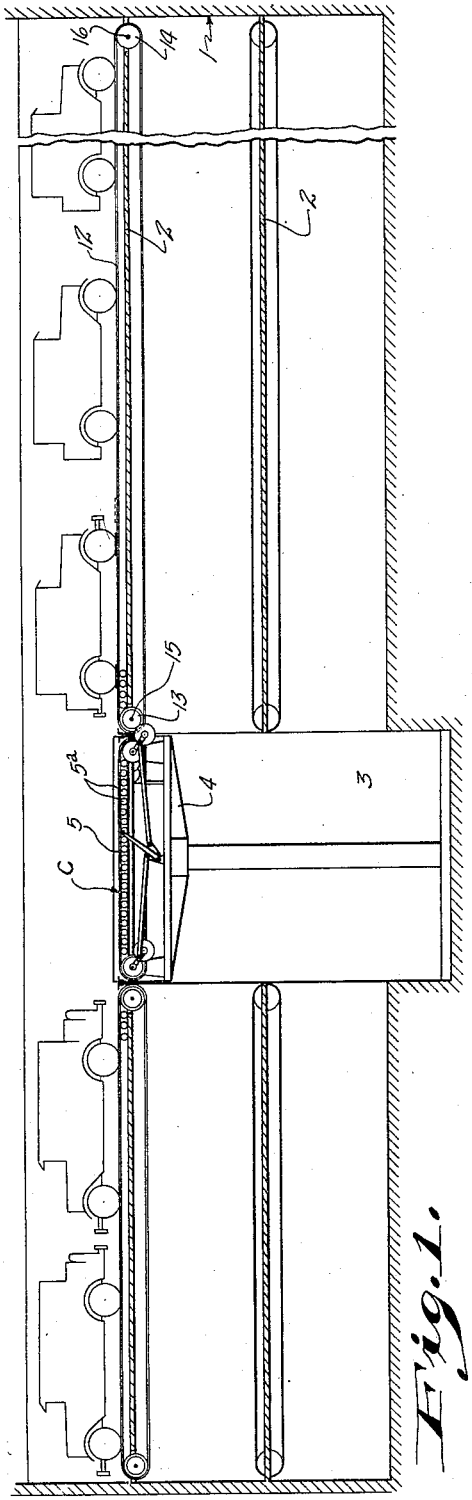
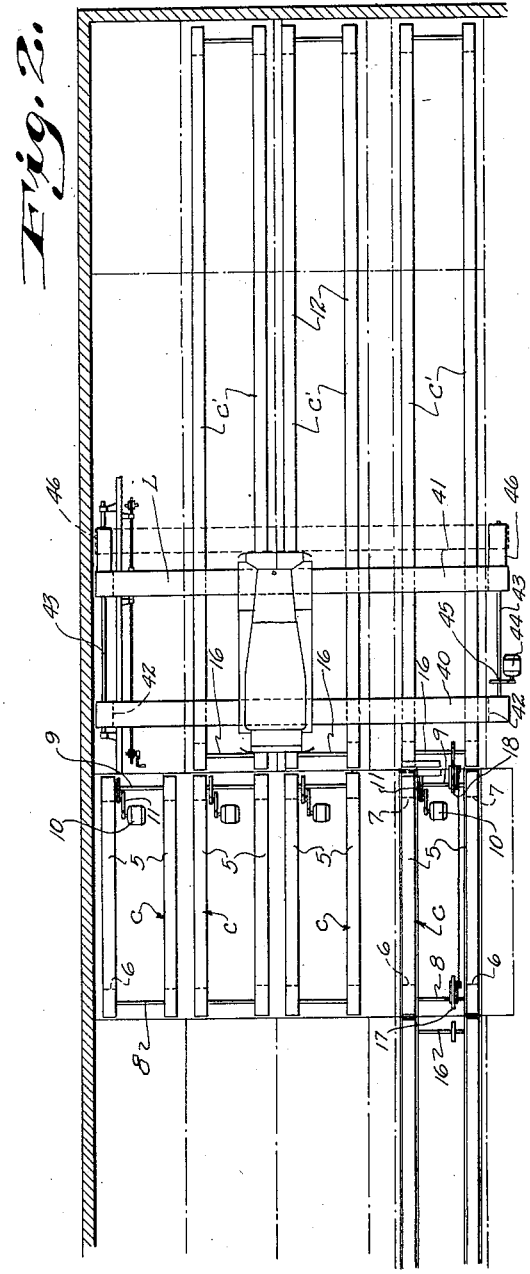
INVENTOR.
Henry Harnischfeger
George J. Lexa
BY
Bottum, Hudnall, Lecher, McNamara and Michael
ATTORNEY.

April 24, 1934.  H. HARNISCHFEGER ET AL  1,955,959
GARAGE
Filed Jan. 16, 1928  2 Sheets-Sheet 2
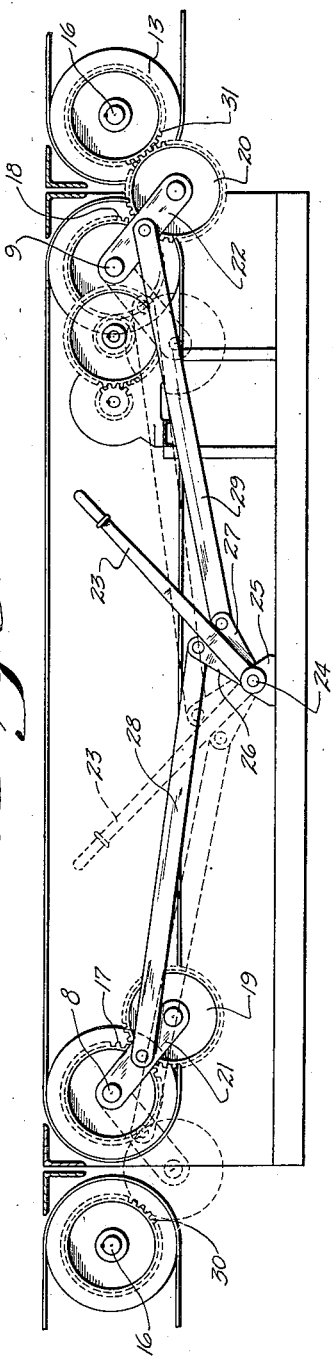
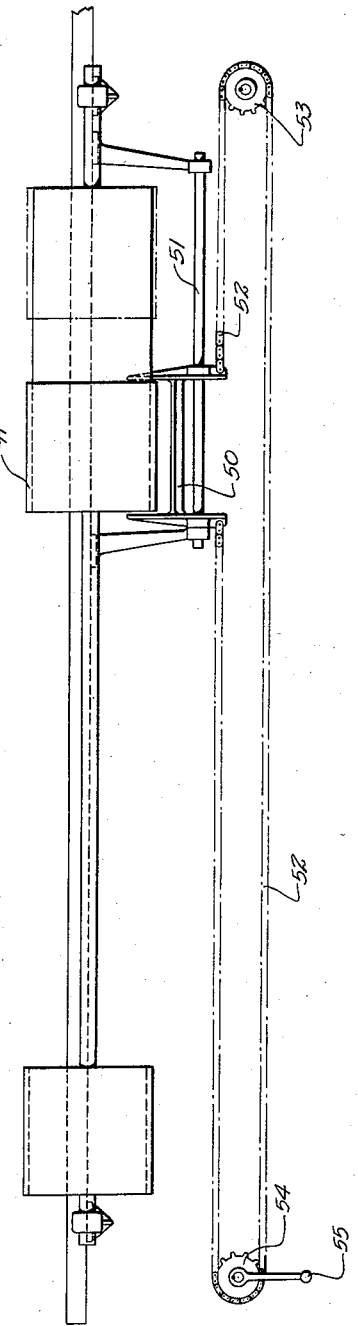
INVENTOR.
Henry Harnischfeger
BY George J. Lexa
ATTORNEY.

Patented Apr. 24, 1934

1,955,959

UNITED STATES PATENT OFFICE 1,955,959

GARAGE

Henry Harnischfeger and George J. Lexa, Milwaukee, Wis., assignors to Harnischfeger Corporation, Milwaukee, Wis., a corporation of Wisconsin Application January 16, 1928, Serial No. 246,968

27 Claims. (Cl. 214—16.1)

This invention relates to a garage for automobiles or other vehicles and is especially designed and adapted for use in mechanically handling and storing vehicles with promptness and dispatch and without liability of damaging or injuring the vehicle or the apparatus.

One of the principal objects of the invention is to provide a garage having these advantages and capacities and embodying an apparatus for handling and storing the vehicles which is of simple and durable construction, speedy, reliable and effective in operation and adapted to be manufactured, installed and operated at a comparatively slight expense.

In carrying out the present invention, a garage building is provided which has a plurality of floors and storage compartments for vehicles on floors of the building. An elevator well is provided in the building adjacent the entrances to the storage compartments and in the elevator well a number of elevators operate and are adapted to be aligned with the various storage compartments. One or more vehicle conveyors extend across each elevator and preferably each vehicle conveyor consists of a set of endless conveyor belts adapted to engage the wheels of the automobile or vehicle. Each conveyor is separately driven and controlled and may be utilized for properly positioning a vehicle on the elevator and also for discharging a vehicle into a storage compartment. In each storage compartment a number of vehicle conveyors are provided. Usually a plurality of vehicle conveyors are provided on the elevator as well as in each compartment and of course there is one conveyor in each compartment for each conveyor on the elevator serving the compartment. The vehicle conveyors in the compartments also preferably comprise sets of endless conveyor belts designed and adapted to engage the wheels of an automobile, these conveyors being arranged longitudinally of the compartments and parallel to each other. At times it may be desirable to shift a vehicle laterally in the storage compartment from one conveyor to another and for accomplishing this purpose, a transverse shifting conveyor is provided in each storage compartment and has endless belts adapted to be positioned and operated to engage the front and rear wheels of a vehicle and to shift the vehicle laterally in the storage compartment.

In one embodiment of the invention the conveyors in the storage compartments are selectively driven from the conveyors on the elevator. Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in transverse vertical section showing a portion of a garage building embodying the present invention;

Figure 2 is a fragmentary plan view of the structure shown in Figure 1, parts being omitted for the sake of simplicity in illustration;

Figure 3 is an enlarged view in side elevation showing the control means for the gearing which drives the conveyors in the compartments from the conveyors on the elevators; and Figure 4 is a detail view in elevation showing one means for shifting the shiftable belt of the lateral conveyor employed in each storage compartment.

Referring to the drawings, it will be seen that the present invention proposes a garage building designated generally at 1 which has a plurality of floors 2. In the building shown, an elevator well 3 extends centrally and longitudinally of the building and in this elevator well a number of elevators illustrated diagrammatically and designated at 4 operate. Each elevator 4 is arranged adjacent the entrances of the storage compartments located at the opposite sides thereof. Preferably each elevator is designed to carry a plurality of cars and the elevator shown is adapted for carrying four cars. For this purpose each elevator has four vehicle conveyors designated generally at C mounted thereon and extending transversely thereof from one side of the elevator to the other. Each conveyor C consists of a pair of endless belts 5 adapted to engage the wheels of an automobile and mounted on and driven by pulleys 6 and 7 fixed to shafts 8 and 9 respectively. The portions of the upper run of each conveyor belt between the pulleys 6 and 7 may be additionally supported in any suitable manner as for instance by means of rollers 5ᵃ. Each shaft 9 may be rotated or driven from a reversible electric motor 10 by means of suitable reduction gearing 11 whereby each conveyor 5 may be driven in either direction at a slow speed.

In each storage compartment 4 vehicle conveyors designated generally at C' are provided. There is one vehicle conveyor C' for each vehicle conveyor C and when an elevator is aligned with any storage compartment, the conveyors C of the elevator are aligned with conveyors C' of the storage compartment. Each conveyor C' also consists of a pair of endless belts designated at 12, the endless belt 12 being mounted on pulleys 13 and 14 fixed to shafts 15 and 16. Rollers 12ª may also be provided to aid in the support of the upper run of the conveyor. These rollers may be rotatably mounted in any appropriate manner and are provided in sufficient number to support the upper run of the conveyor properly. To simplify the illustration, only a few rollers 12ª are diagrammatically shown.

The shaft 15 of each vehicle conveyor C' may be driven from the shaft 8 or 9 of the aligned conveyor C, depending upon whether the particular conveyor C' to be driven is located on one side or on the other of the elevator. To provide for this drive, the shafts 8 and 9 of each conveyor C have gear wheels 17 and 18 fixed thereto and rotating therewith (see Figure 3). Gear wheels 19 and 20 mesh with the gear wheels 17 and 18 and are adapted to roll around these gear wheels 17 and 18 by virtue of their mounting upon links 21 and 22 pivoted to the axis of the gears 19 and 20 and pivotally supported upon the shafts 8 and 9. The gear wheels 19 and 20 may be rolled around the gear wheels 17 and 18 under the control of a hand lever 23 fixed to a shaft 24 pivoted in supporting bearing 25 and having crank arms 26 and 27 connected by bars or connecting rods 28 and 29 with the links 21 and 22, respectively.

The gear wheels 19 and 20 are adapted to be engaged with driven gear wheels 30 and 31, respectively, the gear wheels 30 and 31 being fixed to the shafts 15 on the opposite sides of the elevator.

When any hand lever 23 is swung to the position shown in full lines in Figure 3 the gear wheel 19 is rolled around the gear wheel 17 to the inoperative position shown in full lines and the gear wheel 20 is rolled around the gear wheel 18 until it meshes with the gear wheel 31 and thus drives the gear wheel 31 from the gear wheel 18 when the motor 10 is running. By driving the gear wheel 31 the shaft 16 to which the gear wheel 31 is fixed is also driven and drives the shaft 16 to run the conveyor belts 12. The conveyor in the storage compartment on the opposite side of the elevator may be similarly actuated by swinging the hand lever 23 to the dotted line position shown in Figure 3.

With this construction a plurality of automobiles or other vehicles may be run on to the conveyors C on the elevator at the ground level, the wheels of each automobile engaging the endless belts of its conveyor. The elevator then rises to the floor on which the automobiles are to be stored. The appropriate conveyors C are next actuated to discharge the automobiles from the elevator into the alined storage compartments. The conveyors C' in the storage compartments receive the automobiles so discharged from the elevator and are actuated by appropriately manipulating the hand lever 23 to properly position the automobiles or vehicles in the storage compartment. By driving the conveyors C' from the conveyors C, they are synchronized and adapted to cooperate in effecting complete transfer of the vehicles under the control of the conveyor. It is to be noted that a plurality of automobiles may be stored on each conveyor belt C'.

The discharge of the vehicles from the elevator and their position in the storage compartment is thus positively controlled by the conveyors. When a car is to be delivered, the operation is reversed, the conveyors C', in the compartments, discharging the vehicles onto the elevator conveyors C which in turn properly position the vehicles on the elevator.

The conveyors are moved at slow speeds so that no undesirable momentum is set up in the vehicles as they are transferred from the elevator to a compartment and from a compartment to the elevator. When the belts 5 of any conveyor on the elevator are set in motion, the belts 12 of the aligned conveyor C' in the adjacent storage compartment are also set in motion and are moved at the same speed and in the same direction. Thus, as the belts 5 push the car off of the elevator, the wheels at one end of the car are engaged by the belts 12 and the belts 12 thus assist in effecting complete transfer of the conveyor. When transfer has been effected, the motor 10 is shut off and this stops both conveyors. The motors may be equipped with the conventional electro-magnetic brakes to prevent any free running of the motors after they are shut off.

If a car is to be stored on a conveyor C' of a storage compartment which already has a car thereon, the previously stored car is automatically re-positioned for at the beginning of the operation of the conveyor C' moves and carries the car already thereon inwardly. The reverse is true in transferring cars from the compartments to the elevators. In other words, if three cars are stored in a compartment the transferring of the outermost car to the elevator brings the next car to a position adjacent the elevator.

To facilitate access to the cars located at the inner end of each compartment a lateral conveyor designated at L is provided for the conveyor C' of each storage compartment and may be operated to shift an automobile from one conveyor C' in any compartment to another conveyor C' in the same compartment. This lateral conveyor L comprises transversely extending conveyor belts 40 and 41 having their upper runs overlying the endless belts 12. The conveyor belt 40 is mounted on pulleys 42 and fixed on shafts 43 mounted for rotation in any suitable manner. An electric motor 44 is provided and is geared to one of the shafts 43 as at 45 for driving the conveyor belts. The conveyor belt 41 is mounted on elongated pulleys 46 fixed to the shafts 43 and is adapted to be shifted along the pulleys 46 to make the distance between the conveyors 40 and 41 equal to the wheel base of the automobile to be shifted or this distance may be made greater or less than the wheel base so that the conveyor L will not operate to arrest the progress of an automobile in a storage compartment under the influence of any conveyor C'.

When the belts 40 and 41 are spaced apart a distance equal to the wheel base of an automobile to be shifted laterally, the upper runs of these belts will engage with the front and rear wheels of the automobile when the conveyor C' carrying the automobile moves the automobile on to these belts 40 and 41. Each conveyor C' moves slowly and pushes the automobile therewith. When the wheels at one end of the automobile ride up over one of the belts 40 or 41, the motion of the automobile is not arrested because the conveyor C' is still pushing the automobile by virtue of its engagement with the wheels at the other end thereof. However, as the motion of the automobile continues under the influence of the conveyor C', the wheels at both ends of the automobile will eventually be forced up on to the belts 40 and 41 and in this position, the conveyor C' is ineffective to drive the automobile, but the lateral conveyor L may now be started to shift the automobile. Normally the lateral conveyor L is not in motion. When the automobile has been so shifted as to align it up with the conveyor C' on which it is to be stored, then the automobile may be pushed off of the belts 40 and 41 and on to the belts 12.

Any suitable means may be provided for shifting the conveyor belt 41 and Figure 4 illustrates an example of one such means. As shown in Figure 4 a belt shifter 50 straddles the edges of the belt 41. The belt shifter 50 is slidably mounted on a bearing rod 51 and is controlled by a sprocket chain 52 trained around sprocket wheels 53 and 54 and having its ends connected to the shifter 50. A hand crank 55 may be provided on the sprocket wheel 54 for moving the sprocket chain 52 to cause the belt shifter 50 to move back and forth.

It is to be understood that the lateral conveyor L is not essential and it, together with its driving and shifting means may be omitted entirely. If it is omitted it will be necessary in many instances to transfer cars from a compartment on one side of the elevator shaft to a compartment on the opposite side thereof on the same floor or to a compartment on a different floor in order to deliver a car stored inwardly of other cars in any storage compartment.

It is to be understood that the brakes of the automobile are released when it is being handled by the conveyors.

What we claim as our invention is:

1. A garage building having a plurality of floors, storage compartments on floors of the building, an elevator serving the storage compartments, a plurality of vehicle conveyors on the elevator for moving and properly positioning vehicles on the elevator and for discharging them to the storage compartments, a plurality of cooperable vehicle conveyors in each storage compartment for moving and properly positioning vehicles in the storage compartments of the elevator and for discharging them from the compartments to the elevator, means for shifting vehicles laterally from one conveyor to the other in each storage compartment.

2. A garage building having a plurality of floors, storage compartments on floors of the building, an elevator serving the storage compartments, a plurality of vehicle conveyors on each elevator for moving and properly positioning vehicles thereon and for discharging vehicles from the elevator into the storage compartments, co-operable sets of endless conveyor belts extending longitudinally in the storage compartments and engageable with the wheels of vehicles for moving and properly positioning vehicles longitudinally in the storage compartment and for discharging the vehicles from the storage compartment to the elevator, and a lateral conveyor in each storage compartment having a run overlying the endless conveyor belt thereof and operable to shift the vehicles from one set of endless conveyor belts to another in any storage compartment.

3. A garage building having storage compartments, an elevator, a vehicle conveyor on the elevator, a vehicle conveyor in each storage compartment, motor actuated driving mechanism for the vehicle conveyor on the elevator, a gear element connected in driving relation to the vehicle conveyor in each storage compartment and adjustable means mounted on the elevator and positionable to actuate said gear element from said driving mechanism.

4. A garage building having storage compartments provided with a plurality of vehicle conveyors adapted to engage the wheels of automobiles and lateral conveyors in said storage compartments co-operable with said vehicle conveyors for transferring a vehicle from one conveyor to another.

5. A garage building having storage compartments, an elevator, a vehicle conveyor on the elevator, a vehicle conveyor in each storage compartment, motor actuated driving mechanism for the vehicle conveyor on the elevator including a shaft, a gear element fixed to said shaft, a driven gear element connected in driving relation to the vehicle conveyor in each storage compartment, an adjustable gear element mounted to roll around the periphery of the gear element fixed to the shaft and constantly meshing therewith and adapted to be positioned to mesh with the driven gear element or to be positioned in spaced relation to said driven gear element and means for controlling said adjustable gear element.

6. A garage building having storage compartments, an elevator, a vehicle conveyor on the elevator, a vehicle conveyor in each storage compartment, motor actuated driving mechanism for the vehicle conveyor on the elevator including a shaft, a gear element fixed to said shaft, a driven gear element connected in driving relation to the vehicle conveyor in each storage compartment, an adjustable gear element mounted to roll around the periphery of the gear element fixed to the shaft and constantly meshing therewith and adapted to be positioned to mesh with the driven gear element or to be positioned in spaced relation to said driven gear element, a hand lever, and motion transmission means between the hand lever and the adjustable gear element.

7. The combination of a stall, an automobile conveyor thereon, a carrier having an automobile conveyor thereon and adapted to be moved so as to bring its conveyor opposite the other conveyor whereby an automobile on one conveyor may be transferred to the other, a motor permanently connected to drive one of the conveyors, and means for operatively connecting one conveyor to the other when the two conveyors are oppositely arranged as described.

8. In a garage, a plurality of stalls, each having endless traveling conveying means on which an automobile may be moved into and out of the stall, a carrier having endless conveying means from which an automobile may be delivered to the first conveying means and to which the automobile may be delivered from the first means, means carried by the carrier for causing the travel of the second conveying means, and shiftable means for causing the operating mechanism of the second means to operate the first means in each direction.

9. In a garage, a plurality of floors, a plurality of stalls on the floors, endless conveying means in each stall, on which conveying means an automobile may be moved, a driving shaft in each stall for each conveying means, a pinion on each shaft, an elevator, endless conveying means on the elevator, from which means an automobile may be delivered to the first conveying means, and to which the automobile may be delivered from said first conveying means, when the two conveying means have been placed in alinement by the elevator, means including a driving shaft for operating the second conveyor in each direction, shiftable gearing turned by the latter driving shaft and adapted to be meshed with the gear on the first driving shaft and to be disconnected therefrom, and means for shifting the shiftable gearing into and out of mesh with the pinion of any stall whose conveying means is in alinement with the conveying means on the elevator.

10. In a garage, a plurality of floors, a plurality of stalls on the floors, endless conveying means in each stall, on which conveying means an automobile may be moved, a driving shaft in each stall for each conveying means, an elevator, endless conveying means on the elevator, from which means an automobile may be delivered to the first conveying means, and to which the automobile may be delivered from said first conveying means, when the two conveying means have been placed in alinement by the elevator, means including a driving shaft for operating the second conveyor in each direction, shiftable means operated by the latter driving shaft and adapted to be operatively connected with the first drive shaft and to be disconnected therefrom, and means for shifting the shiftable means into and out of said operative connection with the driving shaft of any stall whose conveying means is in alinement with the conveying means on the elevator.

11. In a garage, a plurality of floors, a plurality of stalls on the floors, endless conveying means in each stall, on which conveying means an automobile may be moved, a driving shaft in each stall for each conveying means, an elevator, endless conveying means on the elevator, from which means an automobile may be delivered to the first conveying means, and to which the automobile may be delivered from said first conveying means, when the two conveying means have been placed in alinement by the elevator, a motor on the elevator, a driving shaft operated by the motor for operating the second conveyor in each direction, shiftable means operated by the latter driving shaft and adapted to be operatively connected with the first driving shaft and to be disconnected therefrom, and means for shifting the shiftable means into and out of said operative connection with the driving shaft of any stall whose conveying means is in alinement with the conveying means on the elevator.

12. In a garage, a plurality of floors, a plurality of stalls on the floors, endless conveying means in each stall, on which conveying means an automobile may be moved, a driving shaft in each stall for each conveying means, an elevator, endless conveying means on the elevator, from which means an automobile may be delivered to the first conveying means, and to which the automobile may be delivered from said first conveying means, when the two conveying means have been placed in alinement by the elevator, a motor on the elevator, a driving shaft operated by the motor for operating the second conveyor in each direction, shiftable means carried by the elevator and operated by the latter driving shaft and adapted to be operatively connected with the first drive shaft and to be disconnected therefrom, and means for shifting the shiftable means into and out of said operative connection with the driving shaft of any stall whose conveying means is in alinement with the conveying means on the elevator.

13. In a garage, a runway, a series of opposing stalls at the sides of the runway, a carrier having travel in the runway, a motor on the carrier, endless automobile conveying means in each stall, and selective driving connections at opposite sides of the carrier, whereby the motor may operate in either direction either of the conveying means between which the carrier may be disposed.

14. In a garage, a plurality of floors, a series of stalls on each floor at each side of a runway intersecting the floors, a carrier having travel in the runway, a motor on the carrier, endless automobile conveying means on the carrier operated in each direction by the motor, endless automobile conveying means in each stall and selective driving connections at opposite sides of the carrier, whereby the motor may operate in either direction either of the second conveying means between which the first conveying means may be disposed.

15. In a garage, a plurality of floors, a plurality of stalls on each floor at each side of a runway intersecting the floors, an elevator having travel in the runway, endless automobile conveying means in each stall, a driving shaft in each stall for each conveying means therein, endless automobile conveying means on the elevator adapted to be positioned between any two opposing stalls on any selected floor, a motor on the elevator for driving the second conveying means in each direction, and shiftable means whereby the motor may drive either of the conveying means in any two opposing stalls between which the second conveying means may be positioned, and whereby the motor may not drive either of the said two conveying means.

16. In a garage, a plurality of floors, a plurality of opposing stalls on the floors at each side of a runway intersecting the floors, endless conveying means in each stall, a driving shaft in each stall for each conveying means, an elevator in the runway, endless conveying means on the elevator, a motor, a driving shaft operated by the motor for operating the second conveyor in each direction, and means whereby the motor may be operatively connected to either of the two driving shafts in the stalls between which the second conveying means may be positioned and whereby the motor may be disconnected from both of the said two driving shafts.

17. In a garage, a plurality of floors, a plurality of stalls at the side of a runway intersecting the floors, an elevator having travel in the runway, conveying means on the elevator, conveying means in each stall, and means on the elevator for causing the conveyors on the elevator and in any stall opposite the latter conveying means to travel so as to transfer an automobile from one of the last two conveyors to the other.

18. In a garage, a plurality of floors, a plurality of stalls at the side of a runway intersecting the floors, an elevator having travel in the runway, conveying means on the elevator, conveying means in each stall, and means on the elevator for causing the conveyors on the elevator and in any stall opposite the latter conveying means to travel simultaneously.

19. In a garage, a plurality of floors, a plurality of stalls at the side of a runway intersecting the floors, an elevator having travel in the runway, conveying means on the elevator, conveying means in each stall, and means on the elevator for causing the conveyors on the elevator and in any stall opposite the latter conveying means to travel cooperatively so as to transfer an automobile from one of the last two conveyors named to the other.

20. In a garage, a plurality of stalls, a carrier having travel to and from each stall, a traveling automobile conveyor on the carrier, a traveling automobile conveyor in each stall, a motor having permanent driving connection with one of the two conveyors so placed that an automobile may be delivered from either one to the other, and means whereby the motor may then be temporarily operatively connected to the other conveyor so that an automobile on one conveyor may be transferred to the other.

21. In a device of the character described, a storage compartment, means for carrying articles to be stored to and from the storage compartment, movable floor elements for the carrying means and the storage compartment, said movable floor elements forming substantially continuations of each other when the carrying means is aligned with the storage compartment, means for effecting a driving connection between the movable floor elements, and means for driving one of the movable floor elements.

22. In a vehicle parking device, tiers of storage compartments arranged in superimposed levels, an elevator for carrying vehicles to any of said storage compartments, a movable floor element in each storage compartment, a movable floor element for the elevator, the movable floor element of the elevator forming substantially a continuation of that of any storage compartment when the elevator is aligned therewith, and means whereby movement of the elevator movable floor element is imparted to that of a storage compartment aligned with the elevator for moving a vehicle from the elevator into the storage compartment and from the storage compartment onto the elevator.

23. In a vehicle parking device of the character described, a storage compartment, a movable floor element for the storage compartment, means for carrying a vehicle to and from the storage compartment, a movable floor element for said carrying means, said movable floor elements forming substantially continuations of each other when the carrying means is aligned with the storage compartment, means for effecting a driving connection between the movable floor elements whereby actuation of one imparts movement to the other to move a vehicle from one to the other and vice versa, said means normally being in inoperative position to permit the carrying means to move past the storage compartment, and means for moving said means into operative position.

24. In a device of the character described, a storage compartment, a movable floor element for said storage compartment, means for carrying vehicles to be stored to and from said storage compartment, and movable floor elements for said carrying means, said floor elements forming substantially continuations of each other when the carrying means is aligned with the storage compartment, means for driving one of said movable floor elements, motion transmitting means at all times drivingly connected with said driven movable floor element, motion transmitting means at all times drivingly connected with the other movable floor element, said motion transmitting means of the floor elements being normally disconnected, and means for moving one of said motion imparting means into engagement with the other to drivingly connect both floor elements.

25. In a device of the character described, a movable floor element upon which articles may be stored, a second movable floor element for carrying articles to and from the first mentioned movable floor element, said movable floor elements forming substantially continuations of each other when aligned, driving means at all times drivingly connected with one of the movable floor elements, means for moving said driving means toward the other movable floor element to effect a driving connection between said floor elements whereby articles may be moved from one to the other upon operation of the floor elements, and means for driving one of said floor elements.

26. In a device of the character described, a storage compartment, a movable floor element for said storage compartment, means for carrying articles to and from said storage compartment, a movable floor element for said carrying means, a driving element, means at all times drivingly connecting the driving element with one of the movable floor elements, means for projecting the driving element toward the other movable floor element while maintaining said driving connection, means drivingly connected with the movable floor element toward which the driving element is projected and engageable by the driving element to drivingly connect said movable floor elements, and means for driving one of said movable floor elements.

27. The combination with a stall, automobile transferring mechanism therein, a carrier having automobile transferring mechanism thereon and adapted to be moved opposite said stall whereby an automobile on the carrier may be transferred to the stall or an automobile in the stall may be transferred to the carrier, a motor arranged to drive one of said mechanisms, and means for operatively connecting one mechanism to the other when the carrier and stall are oppositely arranged.

HENRY HARNISCHFEGER.
GEORGE J. LEXA.